May 22, 1928.
J. S. THOMPSON
FRICTION BRAKE
Filed March 5, 1926
1,670,320
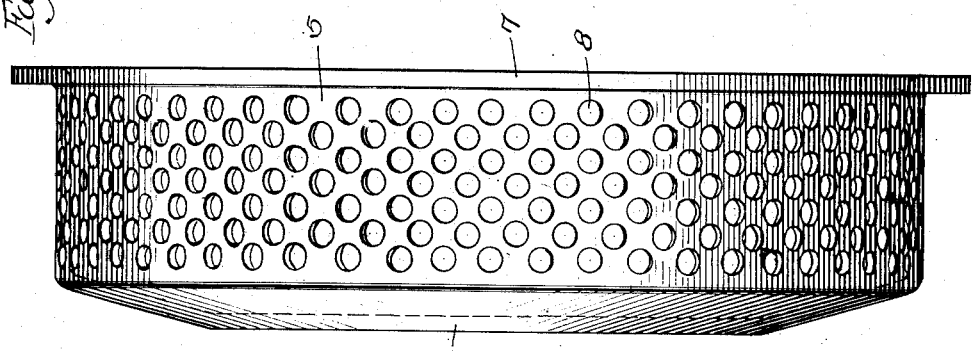
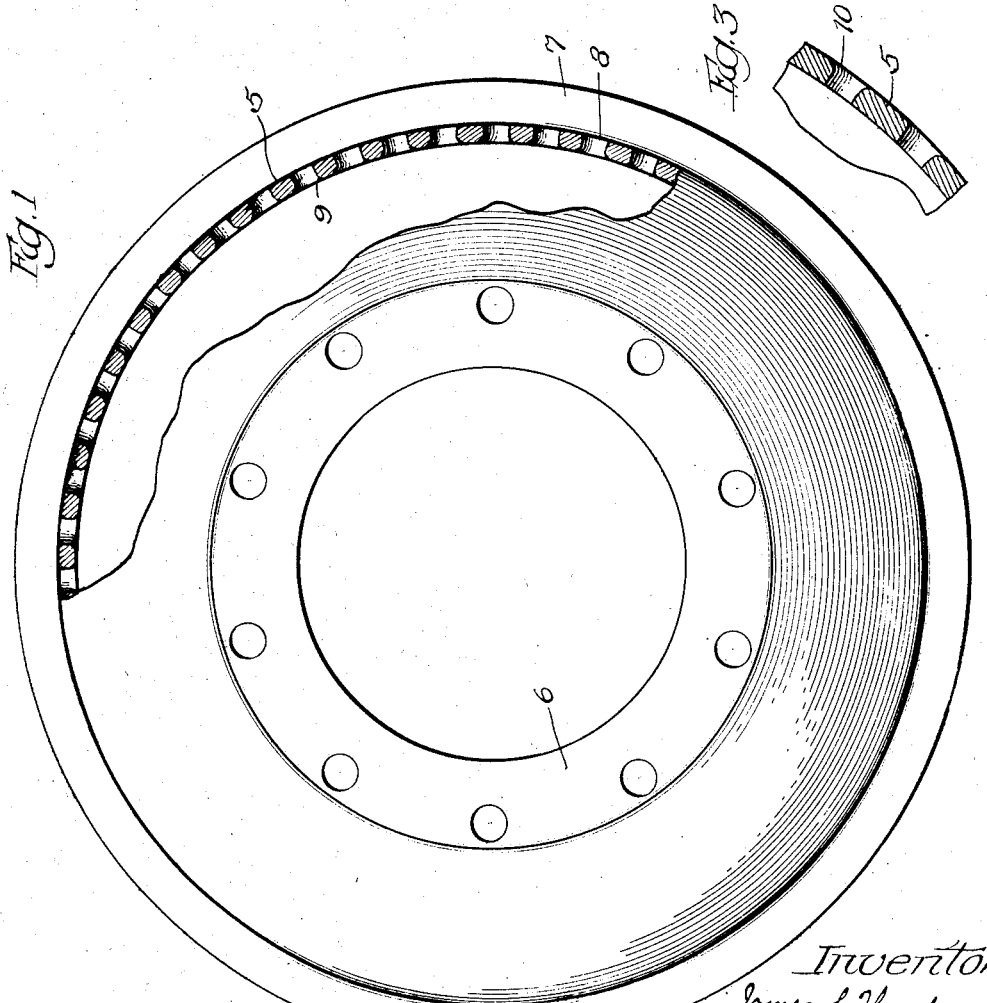
Inventor
James S. Thompson
By Wm O Bell Atty Patented May 22, 1928.

1,670,320

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed March 5, 1926. Serial No. 92,555.

The internal expanding brake and the external contracting brake commonly used in automotive vehicles, and in many other installations, operate upon a drum which is the member to be braked and is made rigid with a wheel or some other element. The braking member of the internal brake has usually comprised a pair of pivoted heads carrying fabric or metal friction lining and means for moving the lining into and out of contact with the inner surface of the drum. The braking member of the external brake has usually comprised a flexible band around the drum, provided with a fabric lining, and means for contracting the band on the outer surface of the drum and for releasing the band.

So far as I am aware it has always been customary to make the rim of the drum, which forms the friction contact surface, continuous, unbroken and imperforate. The drum has a partly closed end which is secured to the wheel, and an open end which is usually closed by a plate rigid on the axle. The drum stores up in its rim much of the heat of friction produced by direct contact of the braking member, or members, and also stores up in its other walls much of the heat of friction conducted thereto from the rim; and the drum also confines the heat of friction radiated interiorly from its walls which tends to promote the storing up effect in the walls.

It is a known fact that a brake drum on an automotive vehicle accumulates and stores considerable heat, so much in fact that it travels by radiation and by conduction to the rim and the rubber tire of the wheel and injuriously affects the tire, causing much damage. The outer surface of the drum of an internal brake has been corrugated circumferentially to assist in disposing of the heat of friction by radiation. However effective this may have been it has not prevented the accumulation of heat in the drum with the consequent disadvantages and damage heretofore mentioned.

It is the object of my invention to provide a ventilated drum which will permit escape of the heat of friction almost as quickly as it is created, so that there will be no such accumulation of heat in the drum as has happened in the past, or which will be in any way detrimental to any of the parts and particularly to the rubber tire.

In the accompanying drawings I have selected for illustrating my invention one type of drum which has been used in an internal expanding brake for automotive vehicles of a heavy type, but I wish it to be understood that the invention is not limited to this particular drum or to any other particular drum, for it will be understood by those skilled in the art, as the invention is further described, that it can be embodied in all kinds of drums, so far as I am aware, which are or may be employed in connection with friction brakes and the like.

Referring to the drawings:

Fig. 1 is an end elevation of a drum embodying the invention, partly broken away and in section.

Fig. 2 is a side elevation of the drum of Fig. 1.

Fig. 3 is a detail sectional view showing how the perforations would preferably be beveled for an external brake.

Referring to the drawings 5 designates the rim of the drum which forms the friction contact surface, 6 the end which is fastened to the wheel, and 7 an annular flange about the other end of the drum which may be dispensed with if desired. Instead of making the rim of the drum continuous, unbroken and imperforate in accordance with past and present practice, I perforate the rim so that throughout its area the rim is provided with many holes 8 radially disposed. I do not limit myself to perforations of any number, of any size or of any arrangement, but I believe it is desirable to stagger the perforations as shown in Fig. 2. I also prefer a relatively large number of small perforations than a small number of large perforations, although both said designs would come within the scope of my invention, as well as a design which includes both small and large perforations, if such design should be found desirable for any purpose. For an internal expanding brake I prefer to round the inner edge of each perforation at 9 and for an external contracting brake I prefer to round the outer edge of each perforation at 10 to avoid sharp edges and to enlarge the perforations in the friction contact surface.

The primary purpose of perforating the rim of the drum is to provide for ventilation of the drum at the friction contact surface so that the heat of friction will be quickly dissipated and will not accumulate or be stored up in the walls of the drum and within the drum. By ventilating the drum in this manner I avoid the disadvantages which result from the drum becoming heated under applications of the brake. A circulation of air will be maintained through the perforations and on both sides of the rim during rotation of the drum, which will carry away the heat of friction before it has a chance to travel by conduction to any material extent away from the rim, and the heat radiated from the drum is dissipated in the atmosphere so that there will be no danger of the rubber tires becoming affected by friction heat from the brake.

This invention is particularly useful in automotive brakes and I have illustrated it in a drum for a brake for a vehicle of a heavy type; but the invention may be embodied in the member to be braked of other types of automotive brakes and also in other types of friction brakes generally.

As before stated I do not restrict the invention to perforations of any size or of any number, or of any arrangement because it may be desirable to change the size and number and arrangement of the perforations to suit different conditions; and I reserve the right to make all such changes as fall within the scope of the following claims:

I claim:

1. In a friction brake, a member to be braked having a plurality of ventilating openings therein, one end of each opening being located in the friction contact surface and having its edge rounded.

2. In a friction brake, a member to be braked having a plurality of ventilating openings therein, one end of each opening being enlarged and located in the friction contact surface of said member.

3. A drum for a friction brake having a rim forming the friction contact surface, said rim having a plurality of ventilating openings therein, the edge of each opening at the friction contact surface being rounded.

JAMES S. THOMPSON.